(12) United States Patent
Szparagowski et al.

(10) Patent No.: US 9,879,785 B1
(45) Date of Patent: Jan. 30, 2018

(54) PTFE FLIP SEAL FOR ROTATING SHAFTS

(71) Applicant: Freudenberg-NOK General Partnership, Plymouth, MI (US)

(72) Inventors: Raymond L. Szparagowski, Bowling Green, OH (US); Ross Maag, Ottawa, OH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 11 days.

(21) Appl. No.: 15/386,465

(22) Filed: Dec. 21, 2016

(51) Int. Cl.
 *F16J 15/32* (2016.01)
 *F16J 15/328* (2016.01)
 *F16J 15/3284* (2016.01)

(52) U.S. Cl.
 CPC ......... *F16J 15/328* (2013.01); *F16J 15/3284* (2013.01)

(58) Field of Classification Search
 CPC .............................. F16J 15/328; F16J 15/3284
 See application file for complete search history.

(56) References Cited

U.S. PATENT DOCUMENTS

| 7,640,917 B2 | 1/2010 | Daniel et al. | |
| 9,574,536 B2 * | 2/2017 | Oohata | F02M 61/14 |
| 2012/0298766 A1 * | 11/2012 | Szparagowski | F02M 61/14 239/1 |

* cited by examiner

*Primary Examiner* — Gilbert Y Lee
(74) *Attorney, Agent, or Firm* — Daniel J. Sepanik, Esq.; Harness, Dickey & Pierce, P.L.C.

(57) ABSTRACT

A seal system includes a housing defining a bore having an inner bore surface. A rotating shaft is rotatably received in the bore and includes a recessed annular groove. A seal body has an unassembled form having a ring shape, wherein in an assembled state the seal member is received in the annular groove of the rotating shaft with the seal member flipped with a first side surface facing radially inward toward the annular groove and a second side surface facing radially outward toward the bore, the first side surface along a cylindrical outer diameter surface being lifted off of a bottom surface of the annular groove so that the second side surface along the outer diameter surface engages the inner bore surface while the second side surface along an inner diameter surface is spaced from the inner bore surface.

18 Claims, 3 Drawing Sheets

PTFE FLIP SEAL FOR ROTATING SHAFTS

FIELD

The present disclosure relates to a seal for rotating shafts.

BACKGROUND

This section provides background information related to the present disclosure which is not necessarily prior art.

Seals are commonly used to seal a gap region between a housing and a rotating shaft of a mechanical device. The seals are used to maintain lubricating fluid in the mechanical device and to keep debris out of the device. For some applications, the seal can tightly engage the shaft and cause friction and heat that can degrade the seals performance over time. In addition, the friction between the seal and the shaft can cause undesirable torque loss.

SUMMARY

This section provides a general summary of the disclosure, and is not a comprehensive disclosure of its full scope or all of its features.

A seal system, includes a housing defining a bore having an inner bore surface. A rotating shaft is rotatably received in the bore and includes a recessed annular groove. A seal body has an unassembled form having a ring shape, wherein in an assembled state the seal member is received in the annular groove of the rotating shaft with the seal member flipped with a first side surface facing radially inward toward the annular groove and a second side surface facing radially outward toward the bore, the first side surface along a cylindrical outer diameter surface being lifted off of a bottom surface of the annular groove so that the second side surface along the outer diameter surface engages the inner bore surface while the second side surface along an inner diameter surface is spaced from the inner bore surface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
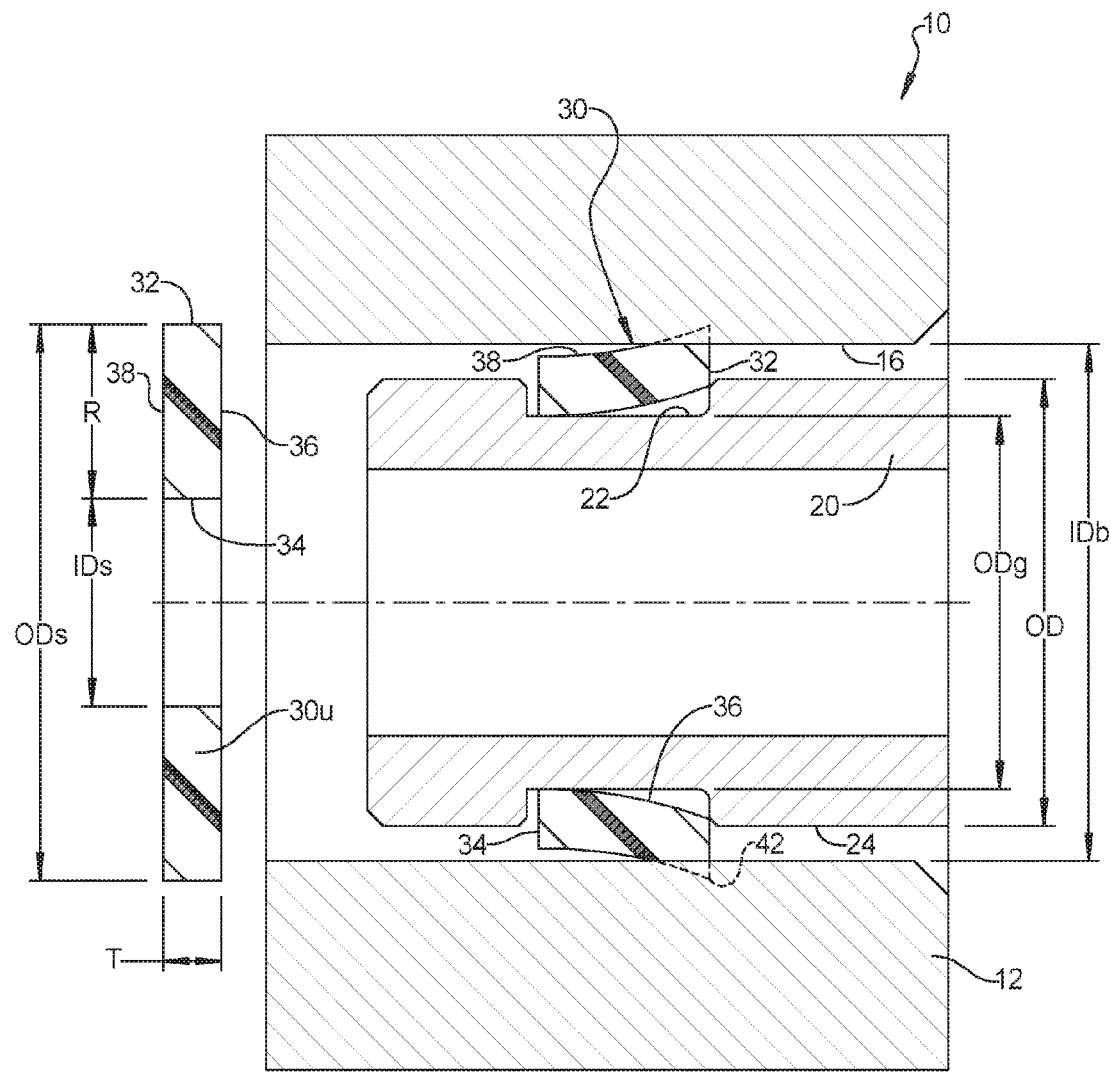
FIG. 1 is a cross-sectional view of a seal system according to the principles of the present disclosure.
Figure 2:
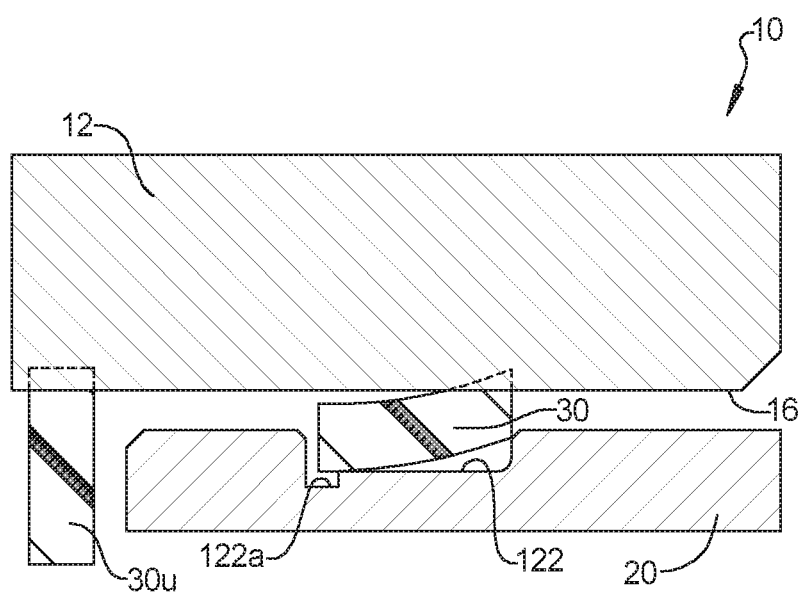
FIG. 2 is a cross-sectional view of an alternative seal system according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a seal system 10 is shown including a housing 12 defining a bore 14 having an inner bore surface 16. A shaft 20 is rotatably disposed in the bore 14 and includes a recessed annular groove 22 in an outer surface 24 thereof. A seal body 30 is assembled in the annular groove 22 and sealingly engages the inner bore surface 16.

The seal body 30 has an unassembled form 30U in which it is ring shaped, as shown in the left-hand portion of FIG. 1. In the unassembled form, the seal body 30U has an outer diameter surface 32 and an inner diameter surface 34 that are each cylindrical in shape. In the unassembled form, the seal body 30U further includes a first side surface 36 and a second side surface 38 that are planar and parallel to one another.

In an assembled state, the seal body 30 is slid over the shaft 20 and into the annular groove 22. The seal body 30 is sized relative to the shaft 20 so that the seal body 30 is "flipped" approximately 90 degrees into a nearly cylindrical form when the seal body is slid over the shaft 20 so that the first side surface 36 faces radially inward toward the shaft 20 and the second side surface 38 faces radially outward toward the inner bore surface 16. The seal body 30 is sized relative to the shaft 20 so that the first side surface 36 along the outer diameter surface 32 is lifted off of a bottom surface of the annular groove 22 and so that the second side surface 38 along the outer diameter surface 32 engages the inner bore surface 16 to define a sealing surface 42 therebetween. It is noted that in FIG. 1, the seal body 30 is shown in its natural "flipped" state upon assembly onto the shaft 20. The overlap of the seal body 30 beyond the inner bore surface 16 is merely illustrative of the interference therebetween, while it should be understood that the seal body 30 would be deformed inward by the inner bore surface 16 when the shaft 20 is inserted therein.

In the unassembled form, the outer diameter surface 32 of the seal body 30U has a diameter $OD_s$ larger than a diameter $ID_b$ of the inner bore surface. This will insure that the sealing surface 42 will have contact and provide a sealing function. As the outer diameter $OD_s$ of the seal body 30 is increased, the torque/friction of the sealing surface 42 increases. In addition, in the unassembled form, the inner diameter surface 34 of the seal body 30 has a diameter $ID_s$ smaller than an outer diameter $OD_g$ of the recessed annular groove 22. This interference is used to keep the seal 30 in position axially when the seal 30 is "flipped" into the groove 22. The interference is also used to prevent lift off of the seal 30 from the shaft 20 under pressure. The seal inner diameter $ID_s$ has to be sufficiently large however, to allow the seal 30 to be stretched over the shaft diameter OD.

The relative dimensions of the seal body 30, the shaft 20 and the bore inner surface 16 can be selected to provide a desired seal engagement force between the sealing surface 42 and the bore inner surface 16. In particular, the amount of relative interference between the seal body 30 in its flipped condition, the shaft 20 and the bore inner surface 16 as well as a thickness T in the axial direction of the seal body 30 and the particular material used for the seal body 30 can be selected to provide a desired seal contact force between the sealing surface 42 and the inner bore surface 16.

Without intending to be limited by a particular example, the seal body 30 can be made from polytetrafluoroethylene and can include carbon or glass fibers. Preferably, the seal material can withstand temperatures of between −40° C. and 150° C. In addition, an exemplary seal system can include an inner bore surface with an inner diameter $ID_b$ of 15 mm, a shaft outer diameter OD of 13.9 mm and a groove outer diameter $OD_g$ of 12.9 mm. The seal body 30U can have an unassembled inner diameter $ID_s$ of 10.5 mm, an unassembled outer diameter of 15.5 mm, and a thickness of 0.85 mm. In order to prevent extrusion of the seal body, it is preferred that a thickness T of the seal body be at least 1.2 times a gap dimension ($ID_b$-OD) between the shaft 20 and the inner bore surface 16. In addition, in order to facilitate the flip over of the seal body 30 from its unassembled to its assembled position, it is preferred that a ratio of the axial thickness T to the radial thickness R is 0.5 or less.

Figure 3:
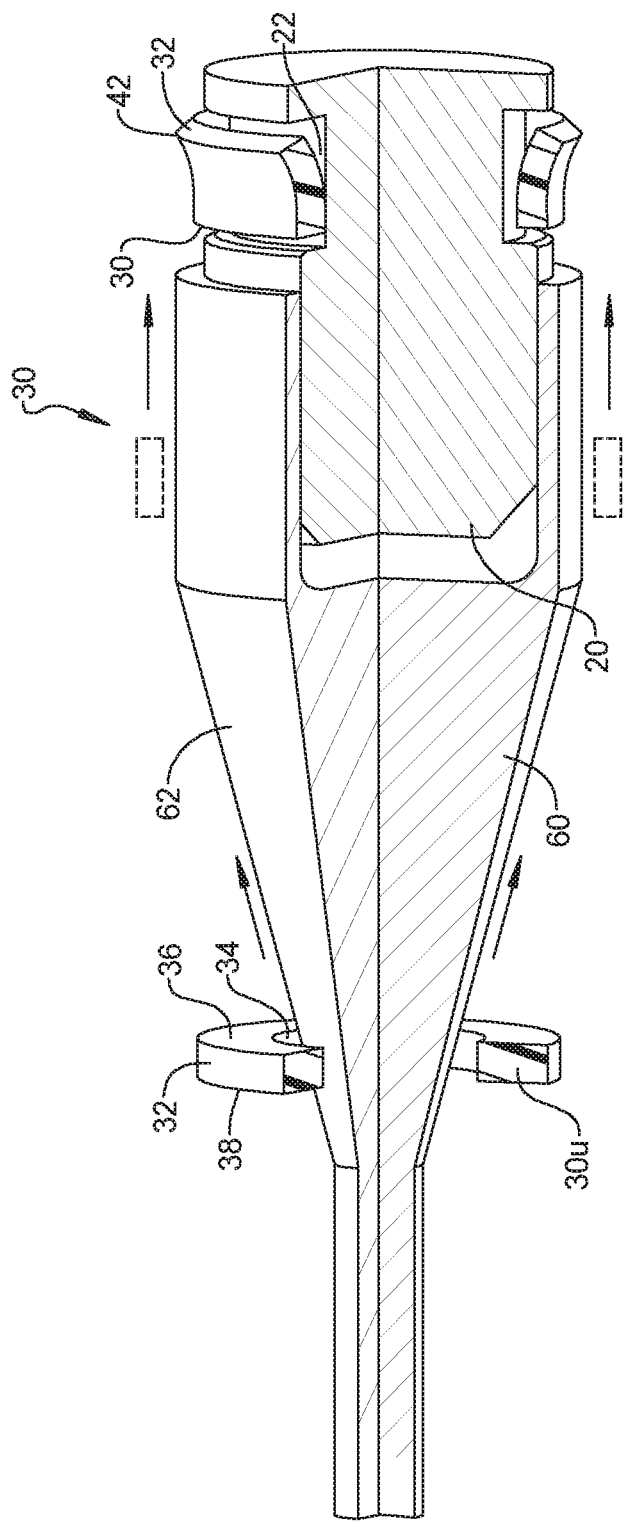
FIG. 3 is a perspective view of an exemplary method assembling a PTFE flip seal on a rotatable shaft according to the principles of the present disclosure.

The seal body 30U is easy to form in a flat ring shape. The seal body 30 is designed to be stretched and snap into the annular groove 22 to form a generally cylindrical shape with a small upward curve on one end after assembly that provides a sealing surface 42 for engaging the inner bore surface 16. The seal 30 can be installed in the annular groove 22 of the shaft 20 by using a tapering tool 60, as shown in FIG. 3. In particular, the seal body 30U in its unassembled form can be slid over an end of the tool 60 that expands the seal body 30 to the size of the shaft 20 as the seal body 30 is slid along the tapering surface 62 of the tool 60 and the seal body 30 is "flipped" until it is received in the annular groove 22. The deformation of the seal body causes the seal body to flip as the side surfaces change from a flat form to a near cylindrical form. In the assembled condition, the inner diameter surface 34 is under tension from the stretching of the seal's inner diameter. This tension will hold the seal body 30 in position to the shaft 20 and also provides a fluid tight seal on the shaft 20.

The curve of the seal body 30 allows the sealing surface 42 to be compressed with low force to reduce friction. This results in an ability of the rotating shaft 20 to run at higher speeds of rotation with low temperature increases.

The seal body 30 results in a high pressure sealing side and a low pressure sealing side of the seal 30. Pressure on the sealing surface side will be forced under the seal and allow for higher pressure sealing. Pressure on the ID strained side will be limited based on a stiffness of the seal body 30. The stiffness can be adjusted by changes in the seal body interference (diameter), material stiffness and thickness T of the seal body 30. The seal design of the present disclosure allows for a shallower groove 22 design than typical square cross-section PTFE seals. This allows for less need for metal thickness on shafts to support shaft strength. This design allows for very low pressure and no pressure sealing. Current square cut seal designs require pressure to energize the seals and allow fluid to drain down when no pressure or insufficient pressure exists.

The annular groove 22 of the shaft 20 can be formed of uniform depth with two end walls, as shown in FIG. 1. Alternatively, other shaped grooves 122 can be used such as with an additional recess region 122a that can help to retain an axial position of the seal 30.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seal system, comprising:
   a housing defining a bore having an inner bore surface;
   a rotating shaft is rotatably received in said bore and including a recessed annular groove; and
   a seal body having an unassembled form having a ring shape having an outer diameter surface and an inner diameter surface and first and second oppositely facing side surfaces extending between the inner diameter surface and the outer diameter surface, wherein in an assembled state the seal member is received in the annular groove of the rotating shaft with the seal member flipped with the first side surface facing radially inward toward the annular groove and the second side surface facing radially outward toward the bore, the first side surface along the cylindrical outer diameter surface being lifted off of a bottom surface of the annular groove so that the second side surface along the outer diameter surface engages the inner bore surface while the second side surface along the inner diameter surface is spaced from the inner bore surface.

2. The seal system according to claim 1, wherein in the unassembled form, the outer diameter surface of the seal body has a diameter larger than a diameter of the inner bore surface.

3. The seal system according to claim 1, wherein in the unassembled form, the inner diameter surface of the seal body has a diameter smaller than an outer diameter of the recessed annular groove.

4. The seal system according to claim 1, wherein in the unassembled form, the inner diameter surface and the outer diameter surface of the seal body are cylindrical.

5. The seal system according to claim 1, wherein in the unassembled form, the first and second side surfaces of the seal body are planar.

6. The seal system according to claim 1, wherein in the unassembled form, the first and second side surface of the seal body are parallel.

7. The seal system according to claim 1, wherein the annular groove includes a recess in a bottom thereof.

8. The seal system according to claim 1, wherein the annular groove includes a locking feature in the groove.

9. The seal system according to claim 1, wherein the seal body in the unassembled form has an axial thickness of at least 1.2 times a gap distance between the inner bore surface and the shaft.

10. The seal system according to claim 1, wherein the seal body in the unassembled form has an axial thickness that is less than 0.5 times a radial thickness of the seal body.

11. A seal system, comprising:
    a housing defining a bore having an inner bore surface;
    a rotating shaft is rotatably received in said bore; and
    a seal body having an unassembled form having a ring shape having an outer diameter surface and an inner diameter surface and first and second oppositely facing side surfaces extending between the inner diameter surface and the outer diameter surface, wherein in an assembled state the seal member is received on the rotating shaft with the seal member flipped with the first side surface facing radially inward toward the rotating shaft and the second side surface facing radially outward toward the bore, the first side surface along the cylindrical outer diameter surface being lifted off of a shaft surface so that the second side surface along the outer diameter surface engages the inner bore surface while the second side surface along the inner diameter surface is spaced from the inner bore surface.

12. The seal system according to claim 11, wherein in the unassembled form, the outer diameter surface of the seal body has a diameter larger than a diameter of the inner bore surface.

13. The seal system according to claim 11, wherein in the unassembled form, the inner diameter surface of the seal body has a diameter smaller than an outer diameter of the shaft.

14. The seal system according to claim 11, wherein in the unassembled form, the inner diameter surface and the outer diameter surface of the seal body are cylindrical.

15. The seal system according to claim 11, wherein in the unassembled form, the first and second side surfaces of the seal body are planar.

16. The seal system according to claim 11, wherein in the unassembled form, the first and second side surface of the seal body are parallel.

17. The seal system according to claim 11, wherein the seal body in the unassembled form has an axial thickness of at least 1.2 times a gap distance between the inner bore surface and the shaft.

18. The seal system according to claim 11, wherein the seal body in the unassembled form has an axial thickness that is less than 0.5 times a radial thickness of the seal body.

* * * * *